United States Patent [19]
Findley, Jr. et al.

[11] Patent Number: 5,629,508
[45] Date of Patent: May 13, 1997

[54] DUAL SMART CARD ACCESS CONTROL ELECTRONIC DATA STORAGE AND RETRIEVAL SYSTEM AND METHODS

[75] Inventors: Raymond Findley, Jr.; Robert Dixon, both of Marietta, Ga.

[73] Assignee: American Card Technology, Inc., Marietta, Ga.

[21] Appl. No.: 383,937

[22] Filed: Feb. 6, 1995

Related U.S. Application Data

[63] Continuation of Ser. No. 352,837, Dec. 2, 1994, abandoned.

[51] Int. Cl.⁶ .................................................... G06K 5/00
[52] U.S. Cl. .................................. 235/38 R; 235/380
[58] Field of Search ................................... 235/380, 375, 235/382, 492, 487; 283/900; 380/3, 4, 23

[56] References Cited

U.S. PATENT DOCUMENTS

| | | | |
|---|---|---|---|
| 4,677,604 | 6/1987 | Selby, III et al. | 235/462 |
| 4,709,136 | 11/1987 | Watanabe | 235/380 X |
| 5,065,429 | 11/1991 | Lang | 380/4 |
| 5,316,998 | 5/1994 | Okuno | 235/380 |
| 5,367,150 | 11/1994 | Kitta et al. | 235/380 |
| 5,513,169 | 4/1996 | Fite et al. | 380/3 |

*Primary Examiner*—Donald T. Hajec
*Assistant Examiner*—Thien Minh Le
*Attorney, Agent, or Firm*—Shoemaker and Mattare Ltd.

[57] ABSTRACT

The present invention pertains to an electronic data access and retrieval system comprising at least first and second smart cards, a first card being encoded with digital data fields representative of predetermined information and a second card including authorization codes for enabling access to and authorized retrieval of selected information from digital data fields of the first card, and includes computer means including display means for displaying the access data. A method is also disclosed of operating an electronic secured access verification display system for displaying an indication of permissable and non-permissable access to a facility of authorized personnel and for verifying the identity of such personnel by providing IDENTITY SMART CARDS, one for each authorized person, and an ACCESS SMART CARD to each authorized operator of the system.

5 Claims, 10 Drawing Sheets

MASTER CARD

ACCESS CARD

IDENTITY CARD

ISSUE LICENSE CARD

DUAL SMART CARD ACCESS CONTROL ELECTRONIC DATA STORAGE AND RETRIEVAL SYSTEM AND METHODS

This application is a continuation of U.S. application Ser. No. 08/352,837, filed on Dec. 2, 1994, now abandoned entitled as set forth above.

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

INCORPORATION BY REFERENCE

The software utilized in the system and methods of the invention has been registered in the U.S. Copyright Office under Copyright Registration No. TX 3-639-032, which includes "Microsoft Access" under Microsoft License Agreement. The registered deposit for this copyright registration is available to the public for inspection and copy at the U.S. Copyright Office. Applicants and their Assignee hereby incorporate herein by reference said copyrighted software (non-patent publication).

FIELD OF THE INVENTION

It is most advantageous to have an automatic system and methods for identifying people or personnel and providing secured access to a facility of authorized personnel upon verifying the identity of such personnel. What is clearly needed is a means of, and methods for, providing automatic, rapid and positive verification of persons who previously have been authorized access to secured areas.

The present invention system and methods have various market applications, one being a race track facility operation having various types of employees and participants, such as pari-mutuel employees, gaming employees, jockeys, animal owners (thoroughbred, greyhound, etc.), and others, and it is desirous to license these people so that you can control their respective access to various respective secured areas of the race track facility.

Accordingly, the present invention provides methods of operating an electronic secured access verification display system for displaying an indication of permissable and non-permissable to a facility of authorized personnel and for verifying the identity of such personnel, comprising the steps of:

a) providing a plurality of IDENTITY smart cards, one for each authorized person, each encoded with digital data representative of personal identity and including official information and a digitized photograph indicative of each authorized person;

b) providing an ACCESS smart card to each authorized operator of the system, each ACCESS card being encoded with control data elements mandatory to operate the system to display permissable and non-permissable access to the facility of each authorized person having an IDENTITY smart card indicative of the identity of each authorized person; and c) inserting into the display system an ACCESS smart card and one of the plurality of IDENTITY smart cards to display permissable and non-permissable access to the facility.

Furthermore, the following method steps are also incorporated into the invention:

a) upon the occurrence of insertion into the system of both the ACCESS card and the IDENTITY card, electronically reading the ACCESS card and determining which fields of data of the IDENTITY card are to be displayed, reading such determined fields of data from the IDENTITY card and displaying the determined fields of data of the IDENTITY card along with the digitized photograph;

b) determining if the IDENTITY card inserted into the system is allowed access to the facility by comparing secured area assignment data contained in the ACCESS card with secured area assignment data contained within the IDENTITY card; and c) displaying permissable access and non-permissable access messages dependent upon verifying both the identity of the IDENTITY card holder and the acceptance of the IDENTITY card by the ACCESS card of the authorized operator of the system.

The method invention further includes the step of encoding each ACCESS card with authorization codes for enabling retrieval of selected data field information from the IDENTITY card.

A long-felt need also exists to provide an electronic data access and retrieval system and a method for accessing and retrieving digital data information from persons by authorized operator/officials of a secured access facility, and for various other purposes. Accordingly, the present invention further provides an electronic data access and retrieval system comprising:

at least first and second smart cards, a first card being encoded with digital data fields representative of predetermined information and a second card including authorization codes for enabling retrieval of selected information from the first card;

computer means including display means for displaying accessed data and having at least first and second smart card read/write means operatively connected to the computer means for reading data fields from and writing data fields to the first and second smart cards; and whereby when the first smart card is placed into the first read/write means and the second smart card is placed into the second read/write means, authorized retrieval of at least some of the data fields contained in the first card is enabled and displayed.

The inventive method of the above-referenced accessing and retrieving digital data information system comprises the steps of:

a) encoding a first smart card with digital data fields representative of predetermined information;

b) encoding a second smart card with authorization codes for enabling authorized retrieval of selected data field information from the first card;

c) electronically reading the authorization codes from the second smart card and retrieving selected information from digital data fields contained in the first smart card; and d) displaying the selected information.

The foregoing and other objects, features and advantages of the invention will be apparent from the following more detailed description of preferred embodiments and methods of the invention, as illustrated in the accompanying drawings.

Fore the sake of brevity, a brief Summary of the Invention system and methods is presented hereinbefore and is not presented separately.

BRIEF DESCRIPTION OF THE DRAWINGS

FIG. 10 depicts, in graphic form, a dual-card IDENTITY smart card issue/update station, the updating function being almost identical to that of FIG. 7 except the system checks that the identity card has been written to.

DESCRIPTION OF INVENTION SYSTEM AND METHODS

The dual-card inventive concept of ACCESS cards and IDENTITY (License) cards are utilized in tandem to supply the functionality of the system.

Figure 1:
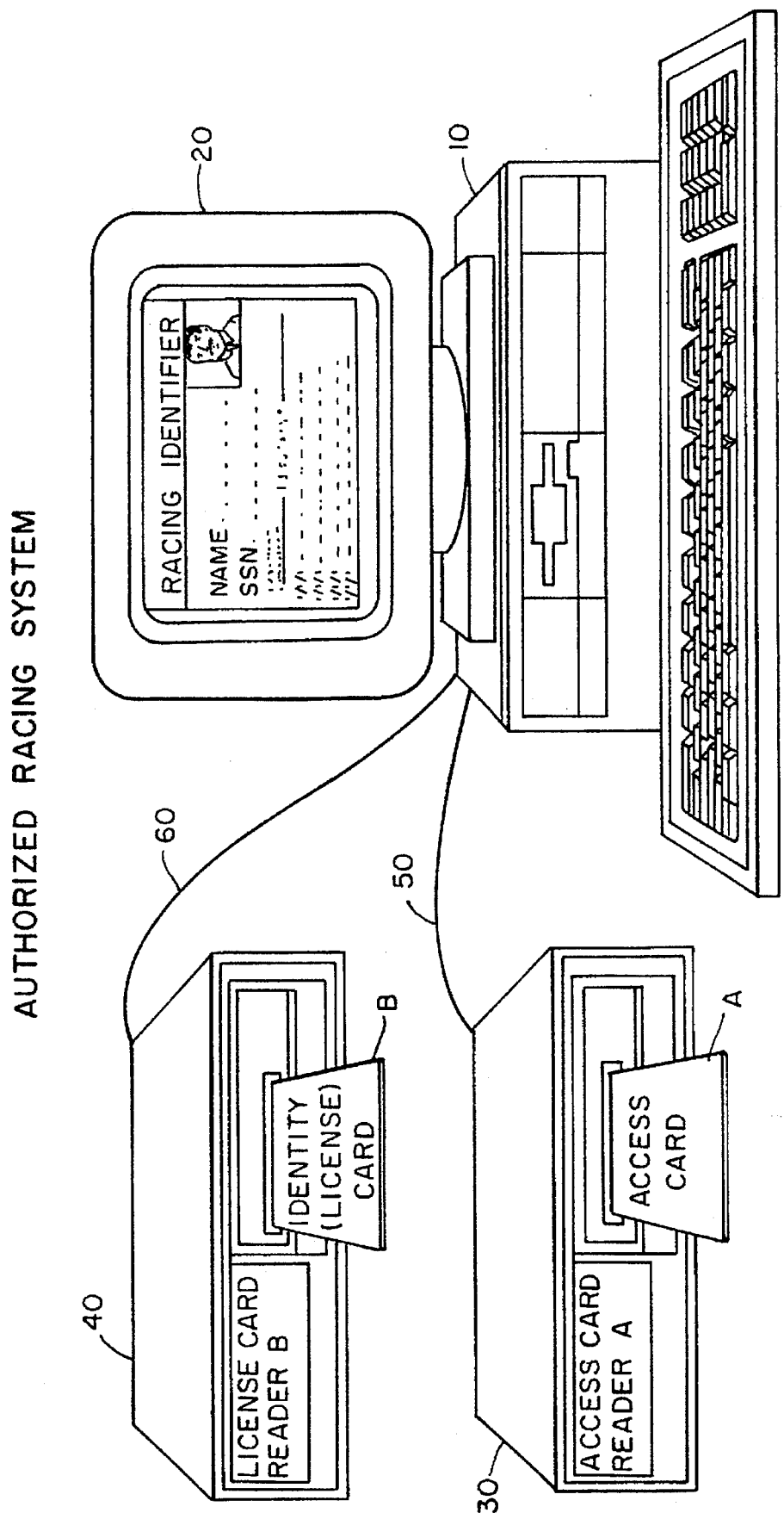
FIG. 1 shows a preferred embodiment of the system invention applicable to an authorized racing track operation.

FIG. 1 shows a preferred embodiment of the system invention applicable to an authorized racing track operation, wherein computer 10 includes a display 20, ACCESS card reader 30 for ACCESS card A is connected via communication link (line) to computer 10 via a parallel port means, and IDENTITY card reader 40 for IDENTITY card B is connected via communication link/line 60 to computer 10 via the parallel port means.

The system of a preferred embodiment constructed in accordance with the present invention and methods, and described with reference to the respective drawings, can be constructed from the following Table, which lists examples of the depicted components:

TABLE A

| COMPONENT | DESCRIPTION |
| --- | --- |
| PC Computer Stations 10 | Gateway 2000 486/dx2/66V having two RS-232 Serial Ports and a Parallel Port |
| Two 9600P Smart Card Readers 30 and 40 | News Datacom 9600P |
| ACCESS Smart Card A | Smart Card with Motorola SC-21 chip |
| IDENTITY Smart Card B | Smart Card with Motorola SC-11 chip |

The invention system and methods utilize smart card technology components which may be defined as a card component that incorporates an integrated circuit chip therein (IC chip) as set forth above with respect to ACCESS smart card A and IDENTITY smart card B. An accepted industry-wide definition of a "smart card" is a credit card size device/component containing an embedded microprocessor chip that stores information for retrieval, which information has previously been written therein. The ACCESS card A is the key to writing and reading all information stored in the IDENTITY card B. Without a suitable ACCESS card, updated information cannot be stored in the IDENTITY card and existing information is inaccessible. ACCESS cards are tailored to the information requirements of the individual issuing the IDENTITY cards and each operator of the system has an ACCESS card which determines which fields that operator is able to write to and read from the IDENTITY card, such card issuing procedures being described in further detail hereinafter, along with a MASTER card feature.

For each secured area access, a plurality of IDENTITY smart cards are issued, one for each authorized person, and each is encoded with digital data representative of personal identity and including official information and a digitized photograph indicative of each authorized person. Also, a photograph of the authorized person can be imprinted on or affixed to the face of an IDENTITY card.

An ACCESS smart card is issued to each authorized operator of the system station located at the secured access area and each ACCESS card is encoded with control data elements mandatory to operate the system station to display permissable and non-permissable access to the secured area of each authorized person having an IDENTITY card indicative of the identity of each authorized person. The ACCESS card A importantly includes authorization codes for enabling retrieval of selected information from a compatible IDENTITY card B.

When the ACCESS card is inserted into read/write component 30 and the IDENTITY card B is inserted into IDENTITY read/write component 40, and these cards are compatible with each other as to accessible fields of data, the authorized information is read from the IDENTITY card and displayed on display means 20. Depending on the type of accessible fields of data information, or profile, of an individual's ACCESS card, the user/holder of the ACCESS card can be limited to the fields of data that are to be written to or read from the IDENTITY card. The controlling "profile" resides in the ACCESS card. Thus, as shown in FIG. 1, compatible ACCESS and IDENTITY cards have been inserted into the respective readers and the system is enabled to retrieve selected information from the IDENTITY card that is displayed on display means 20.

One of the features of the system invention pertains to having an ACCESS card encoded with control data elements mandatory to operate the system station to display permissable and non-permissable access to a secured area. These control data elements of the card's operating system that reside in the ACCESS card are encoded data containing information on how to read and write to the IDENTITY card, which also allows activation of a set of instructions that can reside in the ACCESS card, in the hardware, in the software in the computer 10, or any combination thereof. A different ACCESS card will be able to read different data fields in an IDENTITY card if it is programmed to do so.

Figure 2:
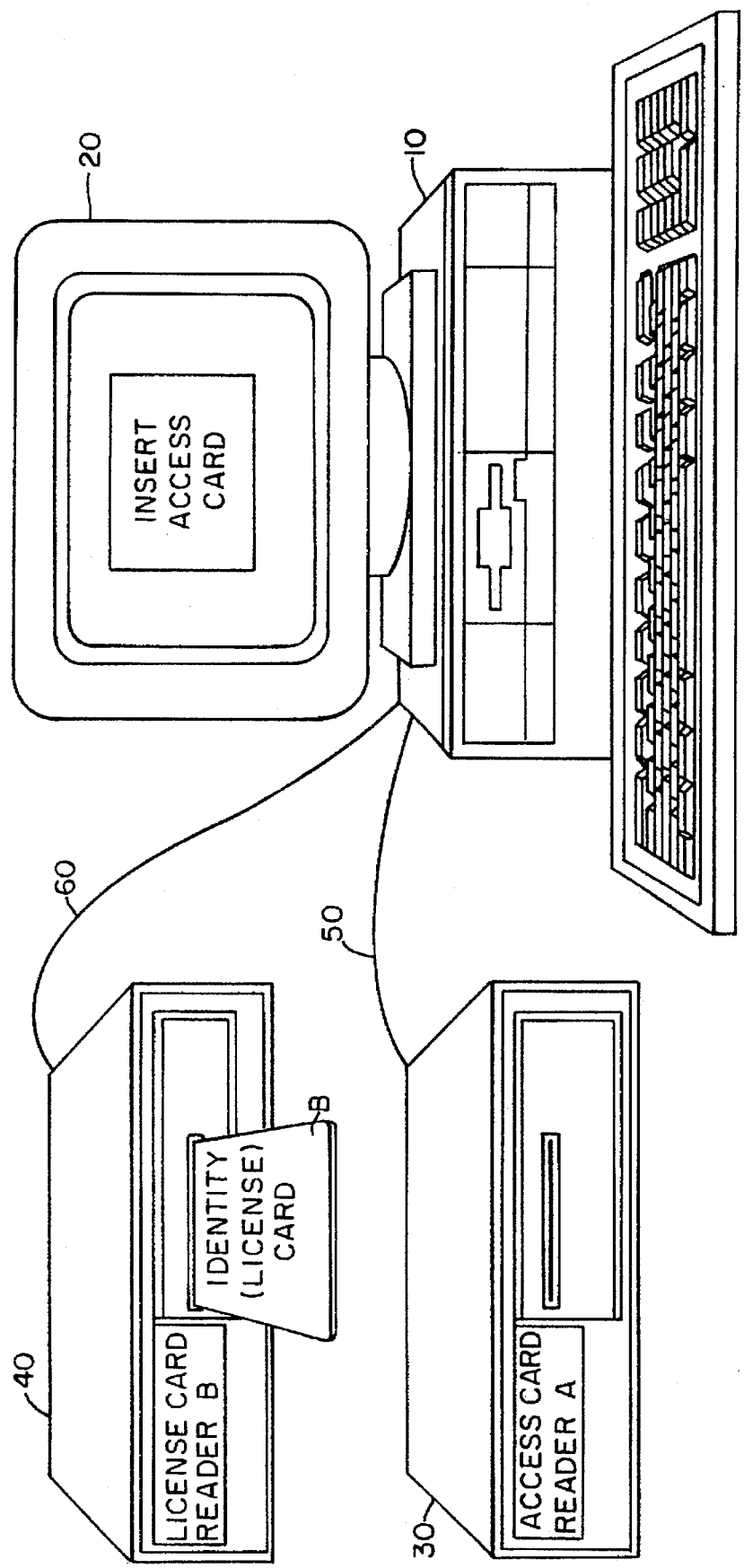
FIG. 2 depicts the FIG. 1 system which cannot be operatively enabled without the use of an ACCESS card.

Now with respect to FIG. 2, for each system operation a first attempt is made to read the ACCESS card; and, if no ACCESS card is inserted into the ACCESS card reader 30, then system operation is not enabled; thus, the information contained in the IDENTITY card cannot be read and displayed, and a display message of "insert ACCESS card" occurs on the display.

With the inventive system, the authorized operator of the computer 10 station located at the entrance to a secured access area is able to peruse personal or history data contained in the assigned data fields of the IDENTITY smart card. In the racing track application, the authorized operator can view information encoded on the IDENTITY card, which could include information as to the various states in which the holder of the IDENTITY card is licensed, as well as any penalty information that that person has received in regard to racing, and other information including date of birth, height, weight, address, etc., of the IDENTITY card holder.

Figure 3:
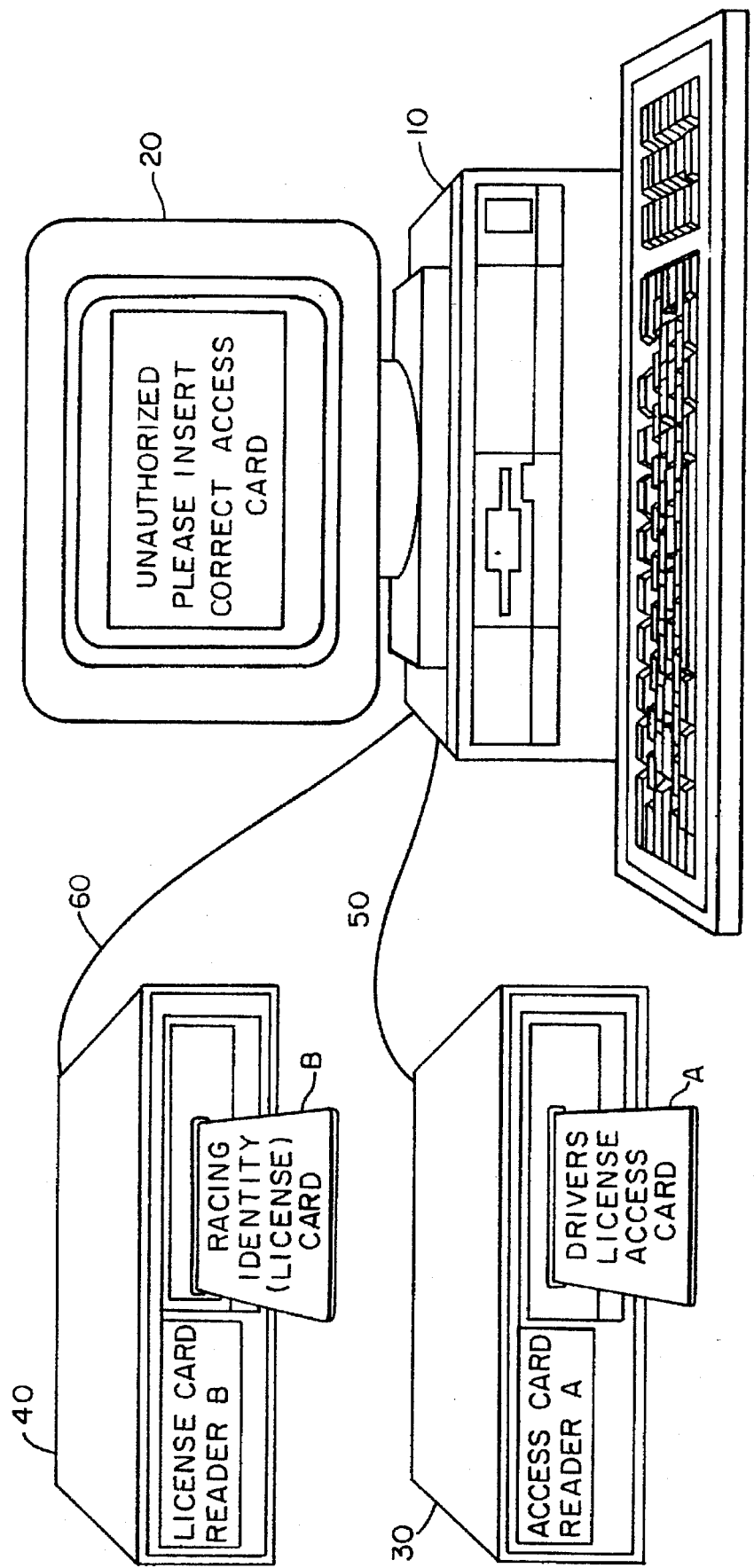
FIG. 3 illustrates a FIG. 1 system operation display message which occurs when an unauthorized ACCESS card is used with an authorized IDENTITY card.

FIG. 3 depicts a FIG. 1 system operation display message which occurs when an unauthorized ACCESS card is used with an authorized IDENTITY card. Accordingly, when the ACCESS card and IDENTITY card conflict, not matching correct fields, an error message appears describing the mismatch, and only inserting the matching cards allows activation of the system station.

Figure 4:
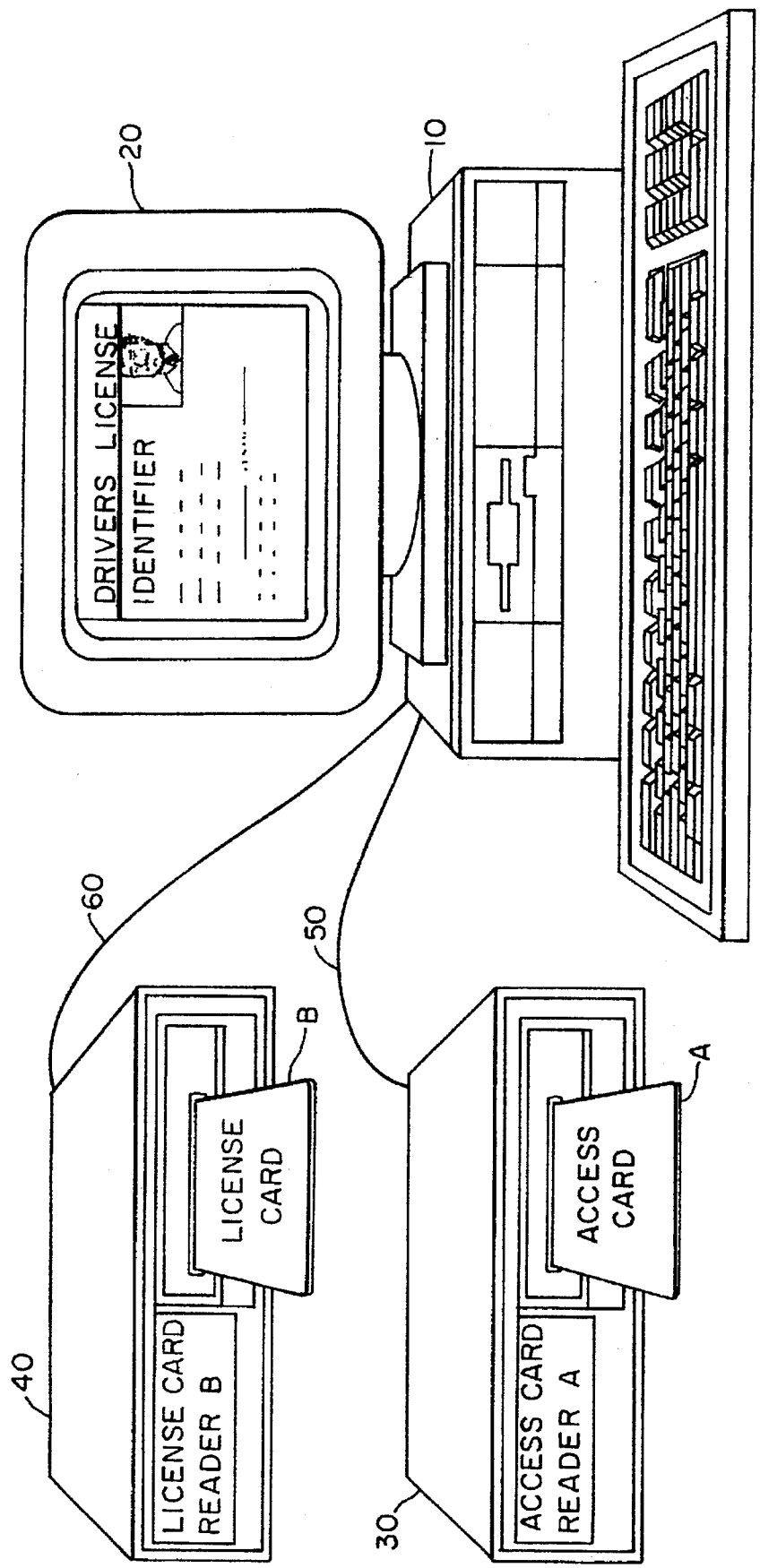
FIG. 4 shows a system embodiment applicable to an authorized Driver's License information access and retrieval operation.

FIG. 4 shows a system embodiment applicable to an authorized Driver's License information access and retrieval operation, another application of the present system and method. Thus, by changing and appropriately programming an ACCESS card means, the entire Card Operating System can be changed without any hardware modifications, which affords easy functionality and added capabilities.

Figure 5C:
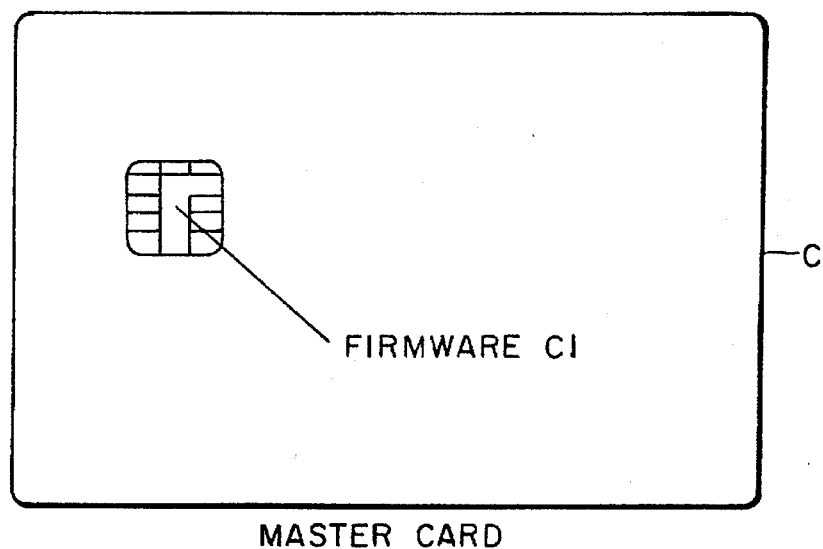
FIGS. 5A, 5B, 5C graphically depict, in exemplary form, an ACCESS smart card A, an IDENTITY (License) smart card B, and a MASTER smart card C, each of which incorporate firmware shown a A1, B1 and C1, respectively.
Figure 5A:
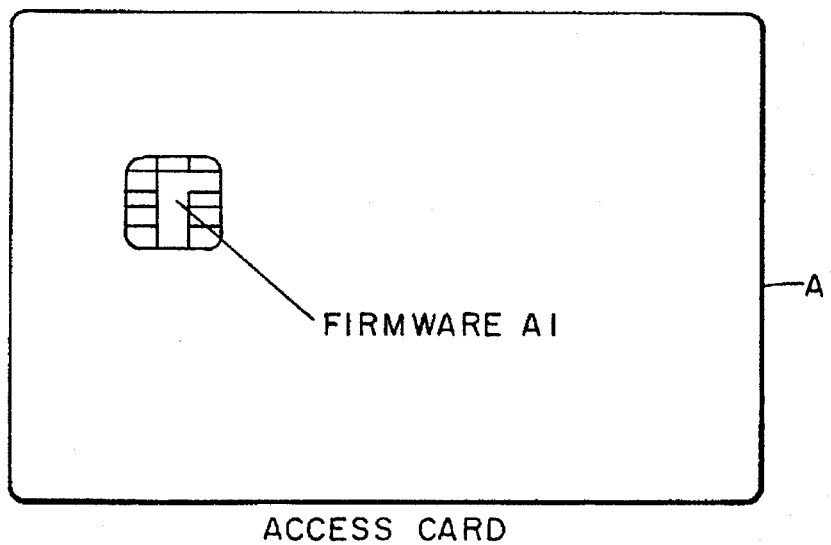
Figure 5B:
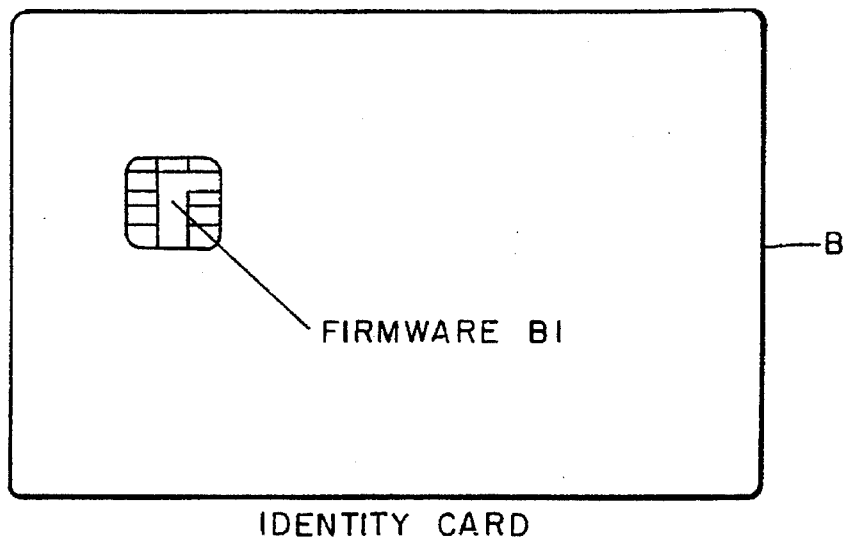

Now with respect to FIG. 5, an exemplary showing of smart cards utilized in the present system and methods, each of the cards incorporate firmware A1, B1, and C1, respectively, for the ACCESS, IDENTITY and MASTER cards, the latter of which will be described hereinafter.

Figure 6:
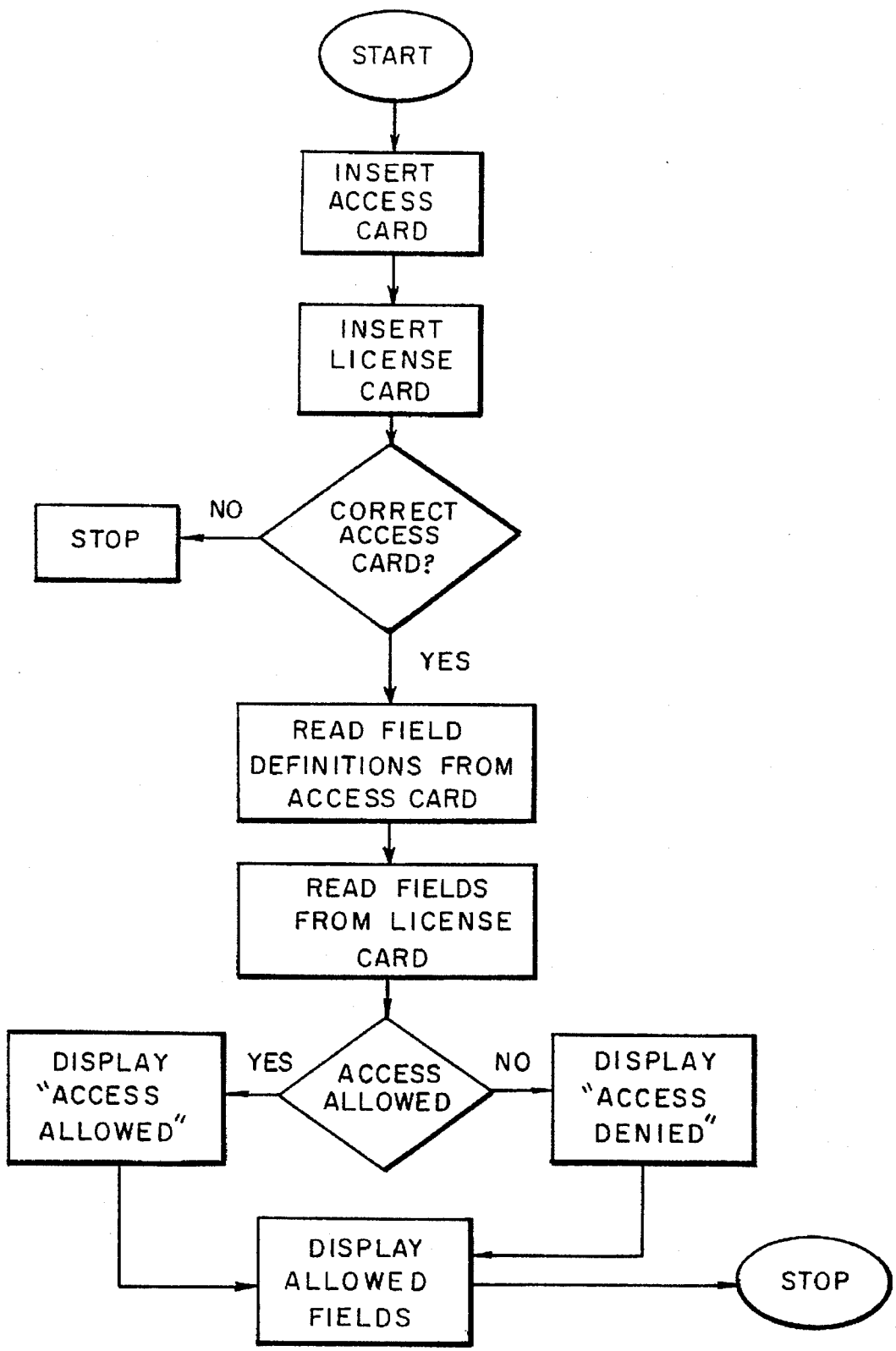
FIG. 6 is a flow chart diagram showing a system operation to display IDENTITY card data.

FIG. 6 provides disclosure of a flow chart diagram showing a system operation to display IDENTITY card data. As shown, an ACCESS card is inserted and an IDENTITY card is inserted, the ACCESS card is interrogated to be compatible or non-compatible with the inserted IDENTITY card, and, if compatible, field definitions and assignment and authorization code fields are read from the ACCESS card, an access decision is made and, if allowed, selected information from the digital data fields of the IDENTITY card are displayed.

Various advantages are created and are available within the invention system and methods, some of which are as follows.

ACCESS control cards permit or deny access to the data contained within an IDENTITY card. These parameters are established by the person who owns and/or administers the system. Dual-card access control allows an administrator graduations of authority to thereby provide various levels of security and access to various operators, employees, etc.

An individual's ACCESS card allows variable levels of security. This permits access to certain data stored on the card defined by the administrator. For example, a security guard may only see a picture for positive ID (identification) of an IDENTITY card holder and determines whether the individual card holder has permission to enter an area. However, the supervisor of a security guard may have a differently encoded ACCESS card with a higher level of security, which would allow the supervisor to view on the display not only the picture of the IDENTITY card holder and access permitted, but also a display may be obtained of an IDENTITY card holder's personal data, such as address, phone, rulings, etc., which are on file in the IDENTITY card data fields, all of this occurring when the supervisor places his particularly programmed ACCESS card into the invention system. Such capacity, therefore, satisfies various issues as to personal privacy, and this feature of the invention can thus provide a plurality of different ACCESS cards, each one of which may contain different levels of security access to the information contained within an IDENTITY card carried or worn by persons, employees, etc.

The invention system also allows the communication of messages through the system on a one-to-one or group basis, and a message list can specify which messages are to be displayed when an individual's IDENTITY card is inserted into the respective reader component.

From the foregoing, one can clearly imagine various other applications of the system and methods provided herein, such as licensing professionals, providing medical histories inclusive of allergy parameters for each card holder, patron tracking, and any other kind of licensing or personal history data information.

Figure 7:
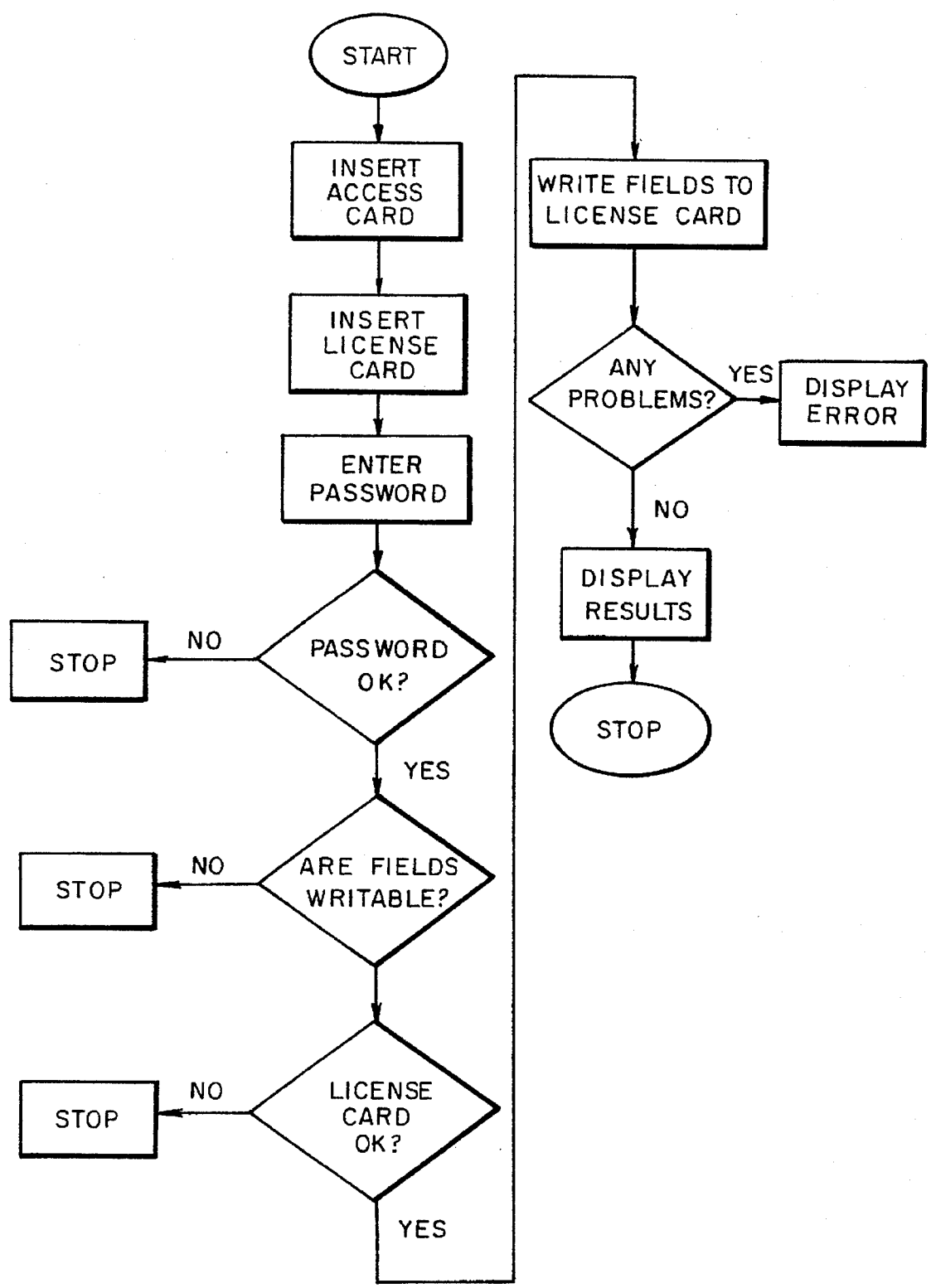
FIG. 7 is a flow chart diagram showing a system operation for issuing IDENTITY (License) cards.

FIG. 7 is a flow chart diagram showing a system operation for issuing IDENTITY (License) cards. As shown therein, an ACCESS card is used to issue a License card and, upon insertion of both cards, a password is entered and, if the password is acceptable, a query is made for "Are fields writable?" and, if so, a decision is made as to the acceptance of the IDENTITY card and, if OK, data fields of information are written to the IDENTITY card, such being checked for any errors or problems; and, if yes, the error is displayed; and, if no, a display results and the operation is terminated.

Figure 8:
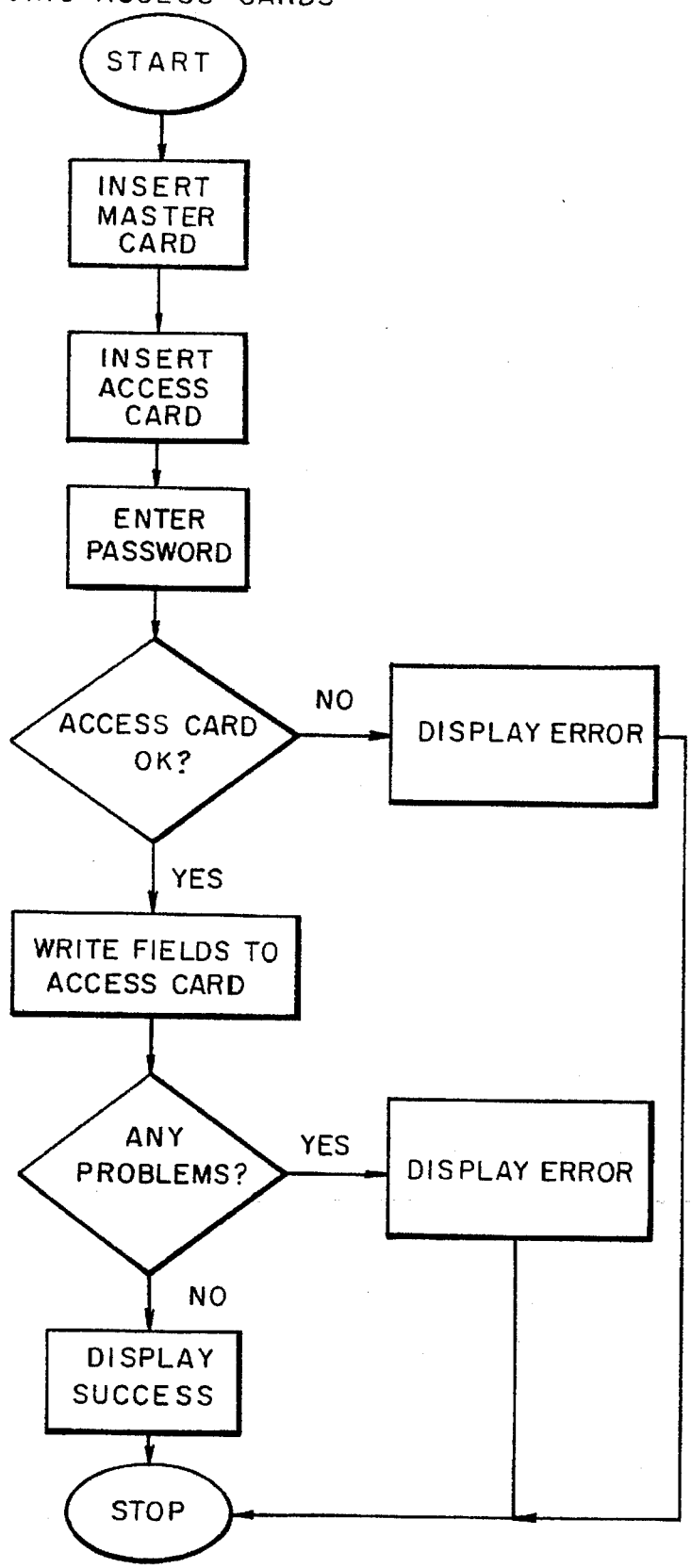
FIG. 8 is a flow chart diagram showing a system operation to issue ACCESS cards.

FIG. 8 depicts a flow chart diagram showing a system operation to issue ACCESS cards and, as shown, a MASTER card is utilized. The MASTER card contains information on how to program the ACCESS card and, without a MASTER card, no ACCESS cards can be issued. Accordingly, both the MASTER and ACCESS cards are inserted, an appropriate password is entered, a decision is made as to the acceptance of the ACCESS card, and, if not, a display error occurs, and if the ACCESS card is accepted, then data fields including authorization codes are written to the ACCESS card, whereafter the written fields are checked for error and, if yes, the error is displayed, and, if no problems are found, the display renders a successful message.

Figure 9:
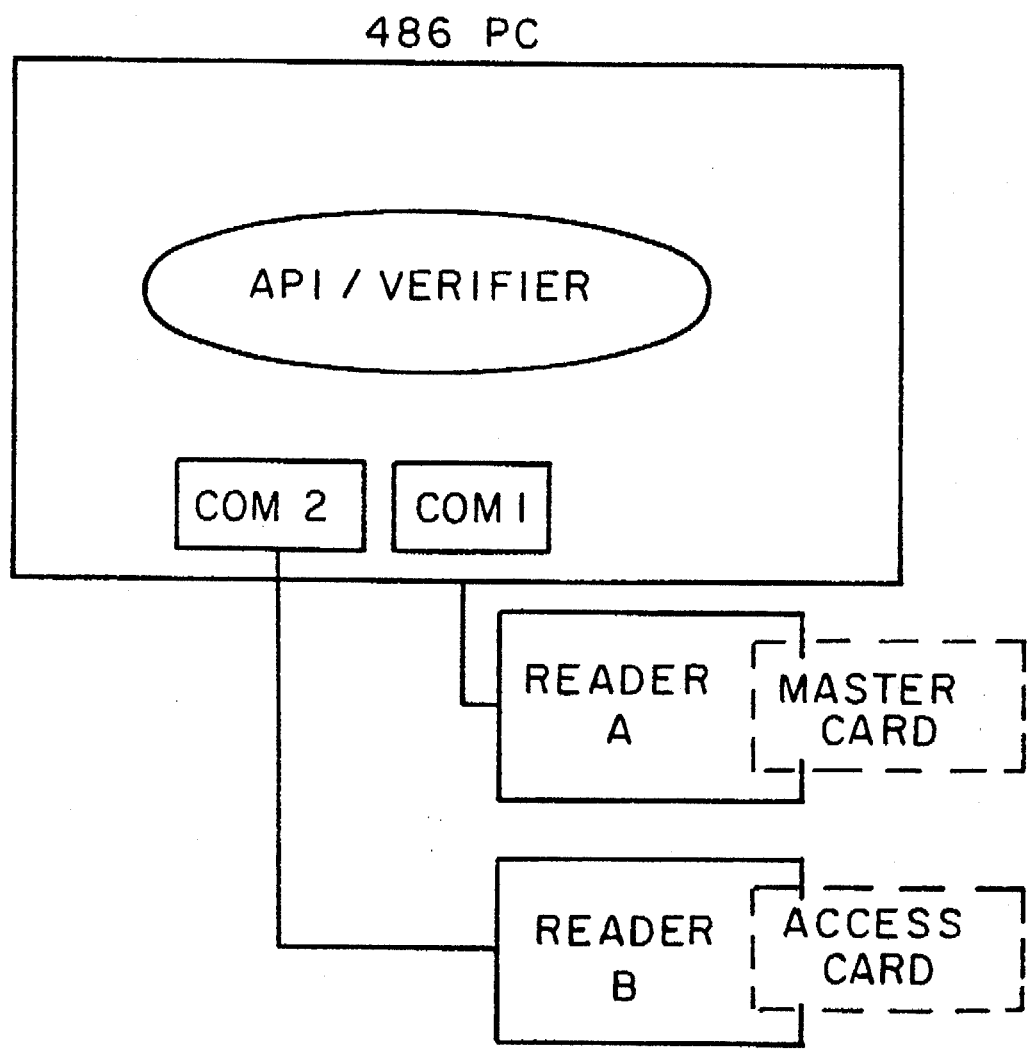
FIG. 9 depicts, in graphic form, a dual-card ACCESS smart card issuing station.

FIG. 9 depicts, in graphic form, a dual-card ACCESS smart card issuing station within which a system function of FIG. 8 is accomplished. As shown in FIG. 9, the MASTER card and ACCESS card are inserted into their respective reader components A and B, which are respectively connected to the COM1 and COM2 serial ports of computer 10. API/Verifier included in computer 10 represents "Application Programming Interface/Verifier" which constitutes software residing in the PC computer 10 for the Card Operating System.

Figure 10:
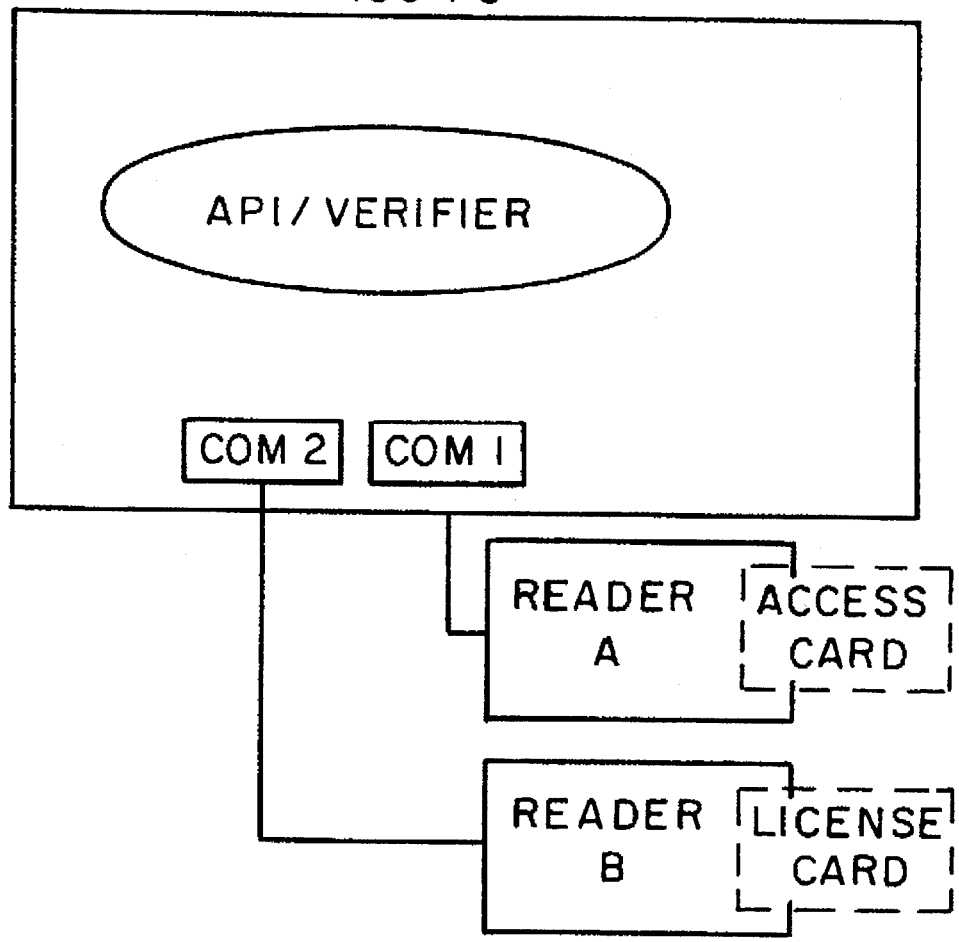

FIG. 10 depicts, in graphic form, a dual-card IDENTITY card issue/update station, the updating function being almost identical to issuing IDENTITY cards, except that the depicted system checks that the IDENTITY card has been written to.

The disclosure set forth hereinabove, with reference to the drawings, and the incorporation by reference to the copyrighted system program, will enable any person skilled in the art to which this invention pertains to assemble and operate the system in accordance with the inventive methods provided herein. It should also be obvious to one skilled in the art that even though communication links/lines 50 and 60 have been depicted as wired lines, various other communication link equivalence could be utilized.

Thus, it is apparent that there has been provided, in accordance with the system invention and methods, an electronic data access and retrieval system and a method of accessing and retrieving digital data information which is applicable to the operation of an electronic secured access verification display system, and that fully satisfies the objectives, aims, and advantages set forth above. It is also further apparent that system operations for issuing IDENTITY cards, ACCESS cards, and dual-card ACCESS or IDENTITY smart card issuing stations have been shown and disclosed.

While the invention system has been described in conjunction with specific embodiments thereof, it is evident that many alternatives, modifications, variations, and applications will be apparent to those skilled in the art in light of the foregoing description. Accordingly, it is intended to embrace all such alternatives, modifications and variations which fall within the spirit and scope of the appended system and method claims.

We claim:

1. An electronic data access and retrieval system comprising:
    at least first and second smart cards, a first card being encoded with digital data fields representative of predetermined information and a second card including authorization codes for enabling access to and authorized retrieval of selected information from said digital data fields of said first card;
    computer means including display means for displaying the accessed data and having at least first and second smart card read/write means operatively connected to said computer means for reading data fields from and writing data fields to said first and second smart cards;
    whereby when the said first smart card is placed into said first read/write means and the said second smart card is placed into said second read/write means, access to and authorized retrieval of at least some of the data fields contained in the said first card is enabled and displayed.

2. A method of accessing and retrieving digital data information comprising the steps of:
    a) encoding a first smart card with digital data fields representative of predetermined information;
    b) encoding a second smart card with authorization codes for enabling access to and authorized retrieval of selected data field information from said digital data fields of said first card;
    c) electronically reading said authorization codes from said second smart card and retrieving said selected information from said digital data fields contained in said first smart card; and
    d) displaying the said selected information.

3. Method of operating an electronic secured access verification display system for displaying an indication of permissable and non-permissable access to a facility of authorized personnel and for verifying the identity of such personnel, comprising the steps of:
    a) providing a plurality of IDENTITY smart cards, one for each authorized person, each encoded with digital data representative of personal identity and including official information and a digitized photograph indicative of said each authorized person;
    b) providing an ACCESS smart card to each authorized operator of said system, each ACCESS card being encoded with control data elements mandatory to operate said system to display permissable and non-permissable access to said facility of each authorized person having an IDENTITY smart card indicative of the identity of said each authorized person;
    c) inserting into said display system an ACCESS smart card and one of said plurality of IDENTITY smart cards to display permissable and non-permissable access to said facility.

4. The method as defined in claim 3 further including the steps of:
    a) upon the occurrence of insertion into said system of both said ACCESS card and said IDENTITY card, electronically reading the said ACCESS card and determining which fields of data of the said IDENTITY card are authorized to be displayed, reading such determined and authorized fields of data from said IDENTITY card and displaying the determined fields of data of said IDENTITY card along with said digitized photograph;
    b) determining if the said IDENTITY card inserted into said system is allowed access to said facility by comparing secured area assignment data contained in said ACCESS card with secured area assignment data contained within said IDENTITY card;
    c) displaying permissable access and non-permissable access messages dependent upon verifying both the identity of the IDENTITY card holder and the acceptance of the said IDENTITY card by said ACCESS card of said authorized operator of the said system.

5. The method as defined in claim 3 further including the step of encoding each ACCESS card with authorization codes for enabling retrieval of selected data field information from the said IDENTITY card.

* * * * *